P. BERNARD.
HOG WATERER.
APPLICATION FILED FEB. 15, 1912.

1,041,412.

Patented Oct. 15, 1912.

2 SHEETS—SHEET 1.

WITNESSES
Howard D. Orr
H. F. Riley

Philip Bernard, INVENTOR
BY E. G. Siggers
ATTORNEY

P. BERNARD.
HOG WATERER.
APPLICATION FILED FEB. 15, 1912.

1,041,412.

Patented Oct. 15, 1912.

2 SHEETS—SHEET 2.

WITNESSES
Howard D Orr
H. T. Riley

Philip Bernard, INVENTOR,
BY E. G. Siggers.
ATTORNEY

UNITED STATES PATENT OFFICE.

PHILIP BERNARD, OF JEFFERSON, SOUTH DAKOTA.

HOG-WATERER.

1,041,412.  Specification of Letters Patent.  Patented Oct. 15, 1912.

Application filed February 15, 1912. Serial No. 677,703.

*To all whom it may concern:*

Be it known that I, PHILIP BERNARD, a citizen of the United States, residing at Jefferson, in the county of Union and State of South Dakota, have invented a new and useful Hog-Waterer, of which the following is a specification.

The invention relates to improvements in automatic watering troughs.

The object of the present invention is to improve the construction of automatic watering troughs, and to provide a simple, inexpensive and efficient hog waterer, equipped with troughs arranged to supply two separate pens, and adapted to be constructed of sufficient size to permit cattle to drink therefrom.

A further object of the invention is to provide a hog waterer of this character, constructed so as to enable an ordinary lamp to maintain the water in the trough in good drinking condition, and also to cause the heat from the lamp to circulate around the tank to prevent the water therein from freezing.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

Figure 1:
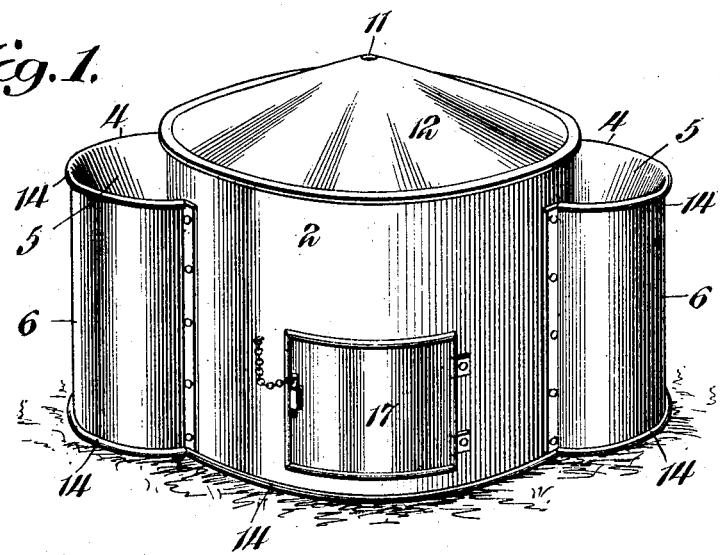
Figure 2:
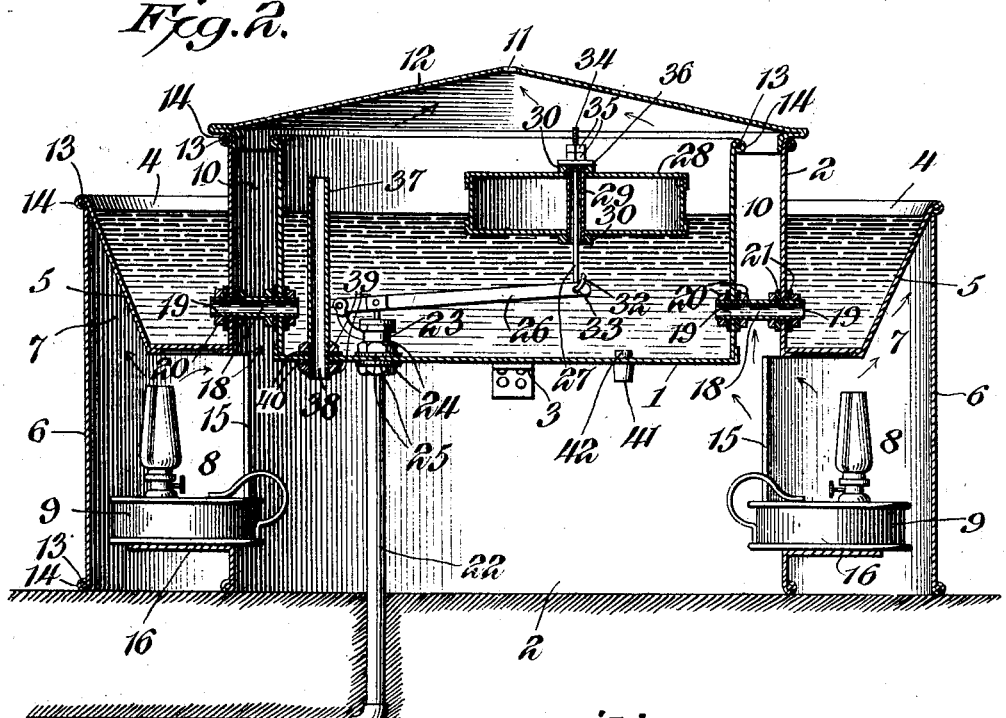
Figure 3:
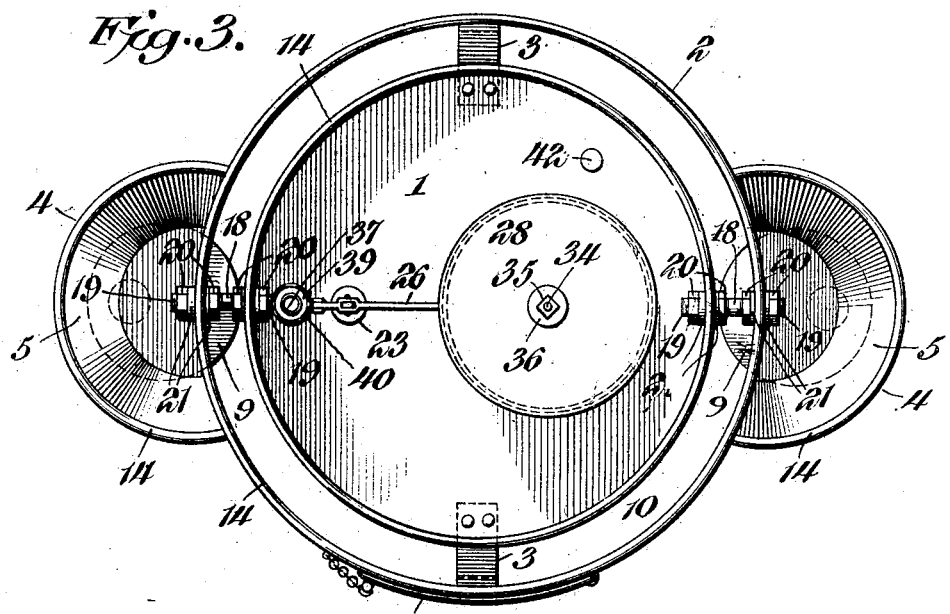
Figure 4:
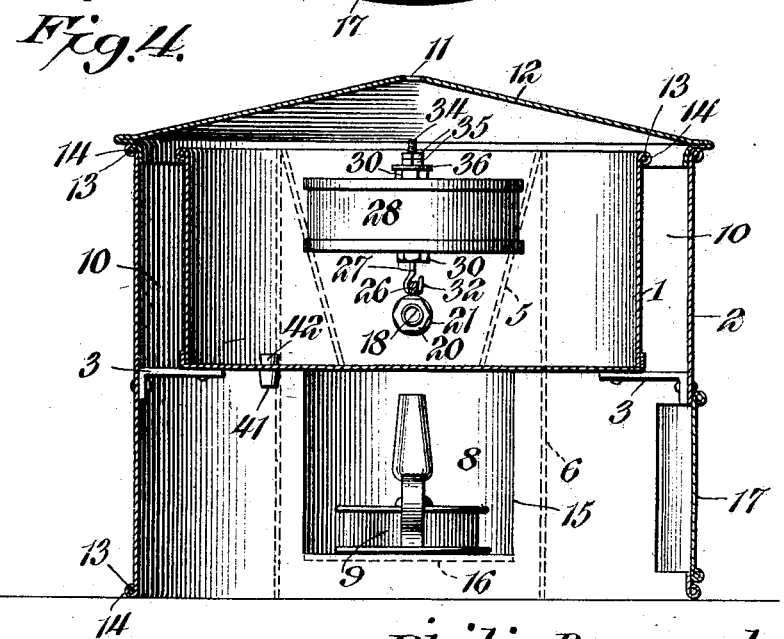

In the drawings:—Figure 1 is a perspective view of a hog waterer, constructed in accordance with this invention. Fig. 2 is a vertical sectional view, taken centrally of the drinking trough. Fig. 3 is a plan view of the hog waterer, the cover being removed. Fig. 4 is a vertical sectional view, taken at right angles to Fig. 2.

Like numerals of reference designate corresponding parts in all the figures of the drawings.

In the accompanying drawings in which is illustrated the preferred embodiment of the invention, 1 designates a tank preferably of cylindrical form and arranged within the upper portion of a cylindrical outer casing 2 and supported by approximately L-shaped brackets 3, secured to the bottom of the tank and to the inner face of the outer casing at diametrically opposite points on the same, as clearly shown in Figs. 3 and 4 of the drawings, but the number and arrangement of the supporting brackets may, of course, be varied to suit the size of a hog waterer. The hog waterer is equipped at opposite sides of the outer casing with exteriorly arranged drinking troughs 4, preferably of semi-elliptical shape and tapered downwardly and having inclined walls 5, extending upwardly and outwardly from the bottoms of the troughs. The exterior drinking troughs are surrounded by vertical jackets 6, also arranged exteriorly of the outer casing and united at their upper edges to the upper edges of the trough, and at their side edges to the outer casing and forming upwardly tapered hot air spaces 7 around the drinking troughs and lower compartments 8 for the reception of lamps 9, or other suitable heaters. The lamps 9 are located directly beneath the troughs, and the heat and other products of combustion impinge against the bottom and side walls of the trough and pass upward into the space 7 and finding no escape at the upper portions thereof are compelled to return and pass upwardly through the intervening space 10 between the tank and the outer casing, which forms a jacket for the tank. The products of combustion pass upward at the sides of the tank and over the same and escape through a central vent opening 11 in a cover 12, fitted on the outer casing and preferably conical in shape, and spaced from the upper edges of the tank. The central vent opening of the cover produces a circulation of the heat and other products of combustion in the manner just described, as it is the only outlet for the escape of the same. By this construction and arrangement, an ordinary No. 2 lamp will maintain the water within the drinking trough in a good drinking condition, and the products of combustion passing around the tank and over the same will prevent water therein from freezing in the coldest weather. The tank, the outer casing, troughs and jackets are constructed of suitable sheet metal, riveted or otherwise secured together and reinforced at the edges by heavy metallic rods 13, arranged within beads 14, so that a stout structure of great strength and durability is provided.

The heat and other products of combustion pass from the lamp receiving compartments 8 through openings 15 in the outer casing, and the metal of the outer casing is partially cut to form the openings 15, being severed at the top and sides and bent downwardly and outwardly to form lamp supports 16, which extend into the compartments 8. The lamp supports 16 are horizontally disposed and the outer casing is provided at one side with a hinged door 17, which affords access to the lamps.

The tank communicates with the troughs through short connecting pipes 18, piercing the tank and the outer casing and having threaded terminals 19, receiving nuts 20 arranged in pairs at each end of the connecting pipes, elastic gaskets 21 being interposed between the nuts and the inner and outer faces of the walls of the tank and the outer casing to form water tight joints or connections. Water is supplied to the tank through a supply pipe 22, connected with any suitable source of supply and equipped with a float controlled valve 23. The supply pipe pierces the bottom of the tank and is threaded to receive nuts 24, arranged at the upper and lower faces of the bottom of the tank, elastic gaskets 25 being interposed between the nuts and the bottom of the tank. The valve 23, which may be of any preferred construction, is equipped with a lever 26, which is connected by a rod 27 with a float 28. The float 28, which is hollow, is preferably cylindrical and is pierced by a centrally arranged vertically disposed tube 29, consisting of a short piece of gas pipe and having threaded terminals for engaging nuts 30, arranged at the top and bottom of the float and preferably soldered to the outer faces of the same. The rod, which extends through the tube 30, is provided at its lower end with a hook 32 for engaging a perforation 33 of the lever 26, and the upper portion 34 of the rod is threaded for the reception of nuts 35, forming an adjustable connection between the valve and the float. A washer 36 is arranged on the rod between the lower one of the nuts 35 and the upper nut 30 of the float, and the two nuts 35 form a lock for securing the rod in its adjustment. The float controlled valve operates automatically and as the water in the drinking troughs is consumed, the float descends and opens the valve, and when the water rises to the predetermined level, the float is raised and closes the valve. By extending the rod through the float in the manner before described, the float will operate in shallow water and may be satisfactorily adjusted under such conditions.

The tank is equipped with an overflow pipe 37 having a threaded lower end 38 piercing the bottom of the tank and provided with upper and lower nuts 39, elastic gaskets 40 being arranged between the nuts and the bottom of the tank to prevent leakage. The tank is also provided at the bottom with a tapered discharge outlet 41, which is normally closed by a plug 42. The discharge outlet enables the tank to be readily emptied, and the circular shape of the tank and the troughs facilitates cleaning the same and enables the hog waterer to be easily maintained in a sanitary condition.

What is claimed is:—

1. A device of the class described including an outer casing, a cover therefor having a vent opening, a tank supported within the upper portion of the outer casing in spaced relation with the cover and with the outer casing to provide an intervening passage, a drinking trough mounted on the exterior of the outer casing and communicating with the tank, a jacket surrounding the trough and connected at its upper edge with the upper edge of the trough and having its side edges connected with the outer casing so as to inclose the space around the sides and bottom of the trough, said jacket forming a compartment below the trough for the reception of a heating device, said outer casing being provided with an opening communicating with the said compartment to permit the heat from the said heating device located within the jacket to pass upward through the space between the outer casing and the tank and over the latter to the vent opening.

2. A device of the class described including an outer casing, a cover therefor having a vent opening, a tank supported within the upper portion of the outer casing in spaced relation with the same and with the said cover to provide a passage around the tank and over the same, drinking troughs mounted exteriorly of the outer casing and communicating with the tank and tapered downwardly so as to present inclined side walls, vertical jackets surrounding the sides and bottoms of the drinking troughs and connected at their upper edges to the same and spaced from the side walls of the trough and connected at their side edges to the outer casing and extending to the bottom of the latter forming compartments beneath the troughs for the reception of heating devices, said outer casing being provided below the troughs with openings communicating with the said compartments, whereby the heat is caused to pass up beneath and around the troughs and also beneath and around the tank and out through the opening of the cover.

In testimony, that I claim the foregoing as my own, I have hereto affixed my signature in the presence of two witnesses.

PHILIP BERNARD.

Witnesses:
 BAT LAFLEUR,
 G. C. ALLARD.